United States Patent
Arai

(10) Patent No.: US 11,044,182 B2
(45) Date of Patent: Jun. 22, 2021

(54) DISPLAY DATA GENERATING DEVICE, DISPLAY DATA GENERATING METHOD, AND INFORMATION PROCESSING SYSTEM

(71) Applicant: Shohei Arai, Kanagawa (JP)

(72) Inventor: Shohei Arai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 55 days.

(21) Appl. No.: 16/240,847

(22) Filed: Jan. 7, 2019

(65) Prior Publication Data

US 2019/0245761 A1 Aug. 8, 2019

(30) Foreign Application Priority Data

Feb. 7, 2018 (JP) .............................. JP2018-020525

(51) Int. Cl.
*G06F 15/173* (2006.01)
*H04L 12/26* (2006.01)
*G06F 11/34* (2006.01)
*G06F 11/30* (2006.01)
*H04L 12/24* (2006.01)

(52) U.S. Cl.
CPC ........ *H04L 43/065* (2013.01); *G06F 11/3065* (2013.01); *G06F 11/3423* (2013.01); *H04L 41/0856* (2013.01); *H04L 43/04* (2013.01); *H04L 43/0876* (2013.01); *H04L 43/106* (2013.01); *H04L 43/045* (2013.01); *H04L 43/067* (2013.01)

(58) Field of Classification Search
CPC .................................................... H04L 43/065
USPC ........................................................ 709/224
See application file for complete search history.

(56) References Cited

U.S. PATENT DOCUMENTS

| | | | | |
|---|---|---|---|---|
| 8,330,984 B2* | 12/2012 | Scaff | .................. | H04L 43/0817 358/1.15 |
| 8,526,037 B2* | 9/2013 | Emori | .................. | G06F 21/608 358/1.15 |
| 8,627,204 B2* | 1/2014 | Coman | ................. | G06F 16/958 715/243 |
| 2007/0242298 A1* | 10/2007 | Lazarus | ............. | G06K 15/1811 358/1.13 |

(Continued)

FOREIGN PATENT DOCUMENTS

| | | |
|---|---|---|
| JP | 2008-102922 | 5/2008 |
| JP | 2014-032627 | 2/2014 |
| JP | 2018-020480 | 2/2018 |

*Primary Examiner* — Anthony Mejia
(74) *Attorney, Agent, or Firm* — Oblon, McClelland, Maier & Neustadt, L.L.P.

(57) ABSTRACT

A display data generating device, method, and information processing system to generate and display usage information of a device. The display data generating device connects to the device via a network, receives from a request source device a request for display data relating to usage information of the device designating identification information of the device, acquires the usage information of the device designating the identification information of the device from a usage information storage device that stores the usage information of the device in association with the identification information of the device, using the usage information of the device that is acquired, generates display data in a layout optimized for a display on which a request source device displays the usage information of the device, and provides the generated display data to the request source device.

14 Claims, 17 Drawing Sheets

(56) References Cited

U.S. PATENT DOCUMENTS

| | | | |
|---|---|---|---|
| 2012/0124039 A1* | 5/2012 | Sandholm | G06F 16/9537 707/724 |
| 2012/0209977 A1* | 8/2012 | Nakajo | G06K 15/1803 709/223 |
| 2013/0073358 A1* | 3/2013 | Sandholm | G06F 16/29 705/14.11 |
| 2013/0144878 A1* | 6/2013 | James | G06F 16/24573 707/736 |
| 2014/0040462 A1 | 2/2014 | Harada | |
| 2016/0342690 A1* | 11/2016 | Young | G09B 5/06 |
| 2017/0039988 A1* | 2/2017 | Whiting | G06F 40/14 |
| 2018/0039452 A1 | 2/2018 | Nagamori | |
| 2018/0053431 A1* | 2/2018 | Young | G06F 16/9535 |
| 2018/0091370 A1 | 3/2018 | Arai | |

\* cited by examiner

FIG. 7

COUNTER SETTING

| DEVICE ID | MAC ADDRESS | DAILY DATA ID | MONTHLY DATA ID | MONTHLY DATA CALCULATION DATE | ... |
|---|---|---|---|---|---|

FIG. 8

DAILY DATA

| DAILY DATA ID | DATE | COUNTER DATA | | | | |
|---|---|---|---|---|---|---|
| | | TOTAL | BY FUNCTION | ... | BY COLOR | BY PAPER SIZE | ... |

FIG. 9

MONTHLY DATA

| MONTHLY DATA ID | DATE | COUNTER DATA | | | | |
|---|---|---|---|---|---|---|
| | | TOTAL | BY FUNCTION | ... | BY COLOR | BY PAPER SIZE | ... |

FIG. 10

CUSTOMER INFORMATION

| CUSTOMER ID | NAME | ADDRESS | TELEPHONE NUMBER | E-MAIL ADDRESS | ... |
|---|---|---|---|---|---|

FIG. 11

DEVICE INFORMATION

| DEVICE ID | CUSTOMER ID | MAC ADDRESS | DAILY DATA ID | MONTHLY DATA ID | ... |
|---|---|---|---|---|---|

DISPLAY DATA GENERATING DEVICE, DISPLAY DATA GENERATING METHOD, AND INFORMATION PROCESSING SYSTEM

CROSS-REFERENCE TO RELATED APPLICATION

This patent application is based on and claims priority pursuant to 35 U.S.C. § 119(a) to Japanese Patent Application No. 2018-020525, filed on Feb. 7, 2018, in the Japan Patent Office, the entire disclosure of which is hereby incorporated by reference herein.

BACKGROUND

Technical Field

The present disclosure relates to a display data generating device, a display data generating method, and an information processing system.

Background Art

A device management system for managing a device by acquiring data from the device connected via a network has been known.

Certain device management systems display, on a browser of a user terminal, a report created by a report creation server on usage frequency, power consumption, carbon dioxide emissions, etc., of the device.

SUMMARY

Embodiments of the present disclosure described herein provide a display data generating device, method, and information processing system for executing an information processing method. The display data generating device connects to a device via a network, receives from a request source device a request for display data relating to usage information of the device designating identification information of the device, acquires the usage information of the device designating the identification information of the device from a usage information storage device that stores the usage information of the device in association with the identification information of the device, using the usage information of the device that is acquired generates display data in a layout optimized for a display on which a request source device displays the usage information of the device, and provides the generated display data to the request source device.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 7 is an illustration of a counter setting configuration according to embodiments of the present disclosure;

FIG. 8 is an illustration of a configuration of daily data according to embodiments of the present disclosure;

FIG. 9 is an illustration of a configuration of monthly data according to embodiments of the present disclosure;

FIG. 10 is an illustration of a configuration of customer information according to embodiments of the present disclosure;

FIG. 11 is an illustration of a configuration of device information according to embodiments of the present disclosure;

Figure 1:
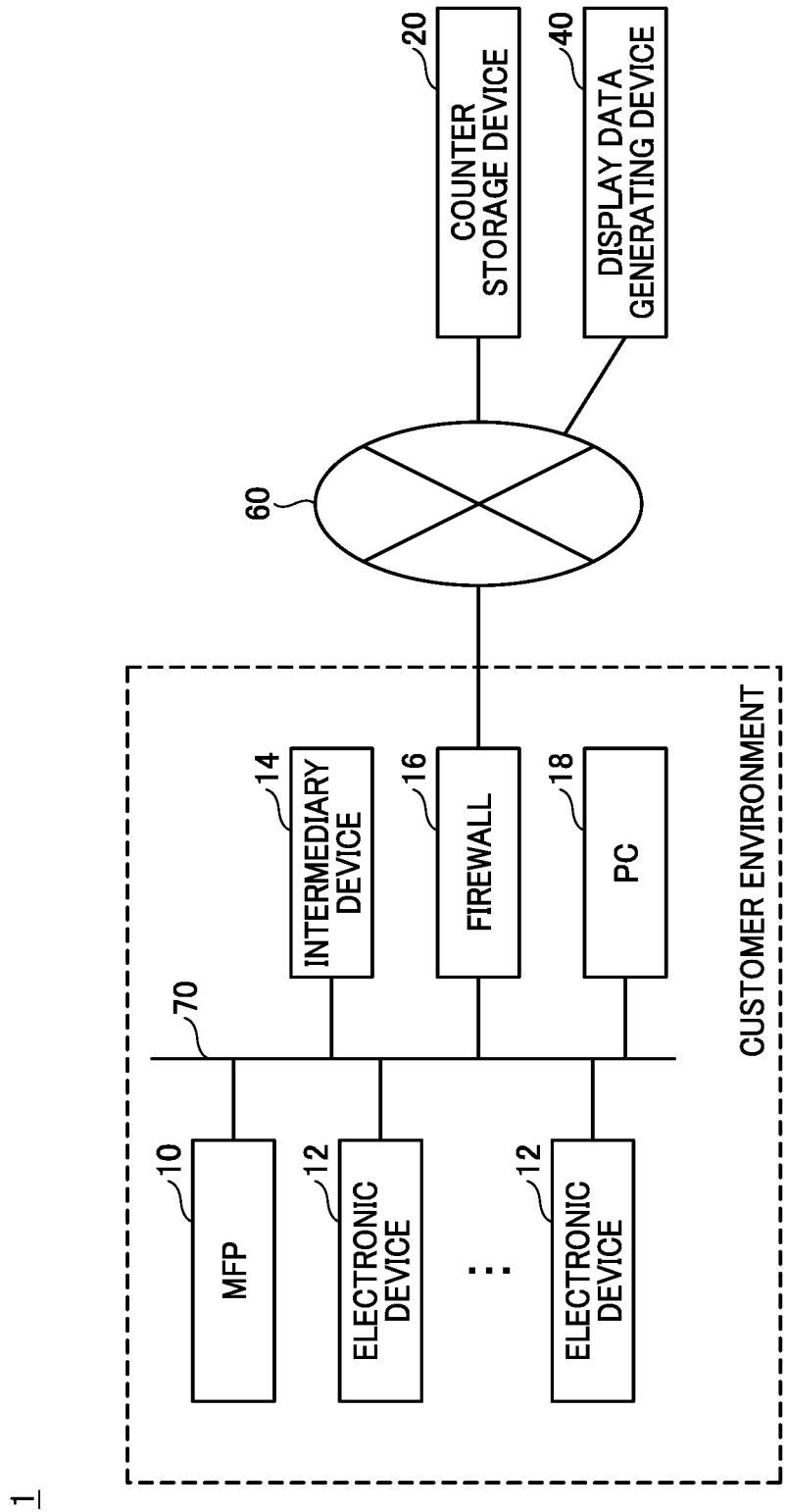
FIG. 1 is a schematic view illustrating a configuration of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a description is given of several embodiments of the present disclosure with reference to the drawings.

[System Configuration]

FIG. 1 is a schematic view illustrating a configuration of an information processing system according to the present embodiment. In the information processing system 1 illustrated in FIG. 1, a customer environment is connected to a counter storage device 20 and a display data generating device 40 via a network 60 such as the internet.

The customer environment is a customer side network environment. The customer may be either an individual user or an organization such as a company, a group, or a division. In the customer environment, an MFP 10, one or more electronic devices 12, an intermediary device 14, a firewall 16, and a PC 18 are connected via a network 70 such as a local area network (LAN).

The MFP 10 is an example of an image forming apparatus. The MFP 10 is a multifunction peripheral having a print function, a scanner function, a copy function, a facsimile function, or the like. The MFP 10 includes an input/output device such as an operation panel and can accept operations from a user and display data. The electronic device 12 is also an example of the image forming apparatus. The electronic device 12 is, for example, a laser printer. Other examples of the electronic device 12 include, but not limited to, a projector, an electronic whiteboard, a video conference device, a camera, an industrial device, a medical device, a car navigation system, or the like having a communication function.

The intermediary device 14, which is implemented by a relay device such as a router, collects usage information (counter data) indicating the use record of the MEP 10 and the electronic device 12 from the MFP 10 and the electronic device 12, and collectively transmits the usage information (counter data) to the counter storage device 20. The MFP 10 may transmit the counter data to the counter storage device 20 directly without intervention of the intermediary device 14. The information processing system 1 may not include the intermediary device 14. The counter data transmitted to the counter storage device 20 is also referred to as lifetime counter data and continues to be counted when the corresponding function or the like is used since the MFP 10 and the electronic device 12 were produced until the present.

The PC 18 is an example of an information processing apparatus and includes an input device such as a mouse and a display device such as a display and can accept operations from the user and display data.

The counter storage device 20, which is implemented by an information processing apparatus operating as a server, stores counter data of the MFP 10 and the electronic device 12 received from the customer environment as described below. The display data generating device 40, which is implemented by an information processing apparatus operating as a server, generates, for example, a graph, a table, or the like to be displayed in a report based on the counter data acquired from the counter storage device 20. In response to a request from the MFP 10, the display data generating device 40 generates, for example, the graph, the table or the like of the counter data corresponding to the MFP 10 identified by the identification information and provides the generated data to the MFP10. In response to the request from the PC 18, the display data generating device 40 generates display data corresponding to the identification information of a device (the MFP 10 or the electronic device 12) designated from the PC 18 and provides the generated display data to the MFP 10.

The display data generating device 40 may acquire the counter data corresponding to the identification information of the device (the MFP 10 or the electronic device 12) designated by the MFP 10 and provide the display data generated using the acquired counter data to the MFP 10. It is assumed that the display data generated by the display data generating device 40 is displayed on the MFP 10 or the PC18 that requested the display data in a user-friendly format. The MFP 10 or the PC18 which received the display data from the display data generating device 40 displays the report depicting the usage information of the MFP 10 or the electronic device 12 in the graph, the table, or the like as described below.

The configuration of the information processing system 1 illustrated in FIG. 1 is one example, and one or more servers such as a proxy server or a gateway server may be interposed between the customer environment and the counter storage device 20 and the display data generating device 40. The counter storage device 20 and the display data generating device 40 may be implemented by being distributed among a plurality of information processing apparatuses. Some or all of the functions of the counter storage device 20 and the display data generating device 40 may be provided in other servers. The counter storage device 20 and the display data generating device 40 may each or together be implemented by a single information processing apparatus.

As described above, in the information processing system 1 according to the present embodiment, the counter storage device 20 collects information indicating the record of actual usage of the MFP 10 and the electronic device 12. The display data generating device 40 specifies device identification information and acquires the counter data from the counter storage device 20. In response to the request from the MFP 10 or the PC 18, the display data generating device 40 generates display data using the acquired counter data and provides the display data to the MFP 10 or the PC 18. Based on the provided display data, the MFP 10 or the PC 18 can display the report on the usage information of the MFP 10 or the electronic device 12 in the graph, the table, or the like as described below.

[Hardware Configuration]

Computer

Figure 2:
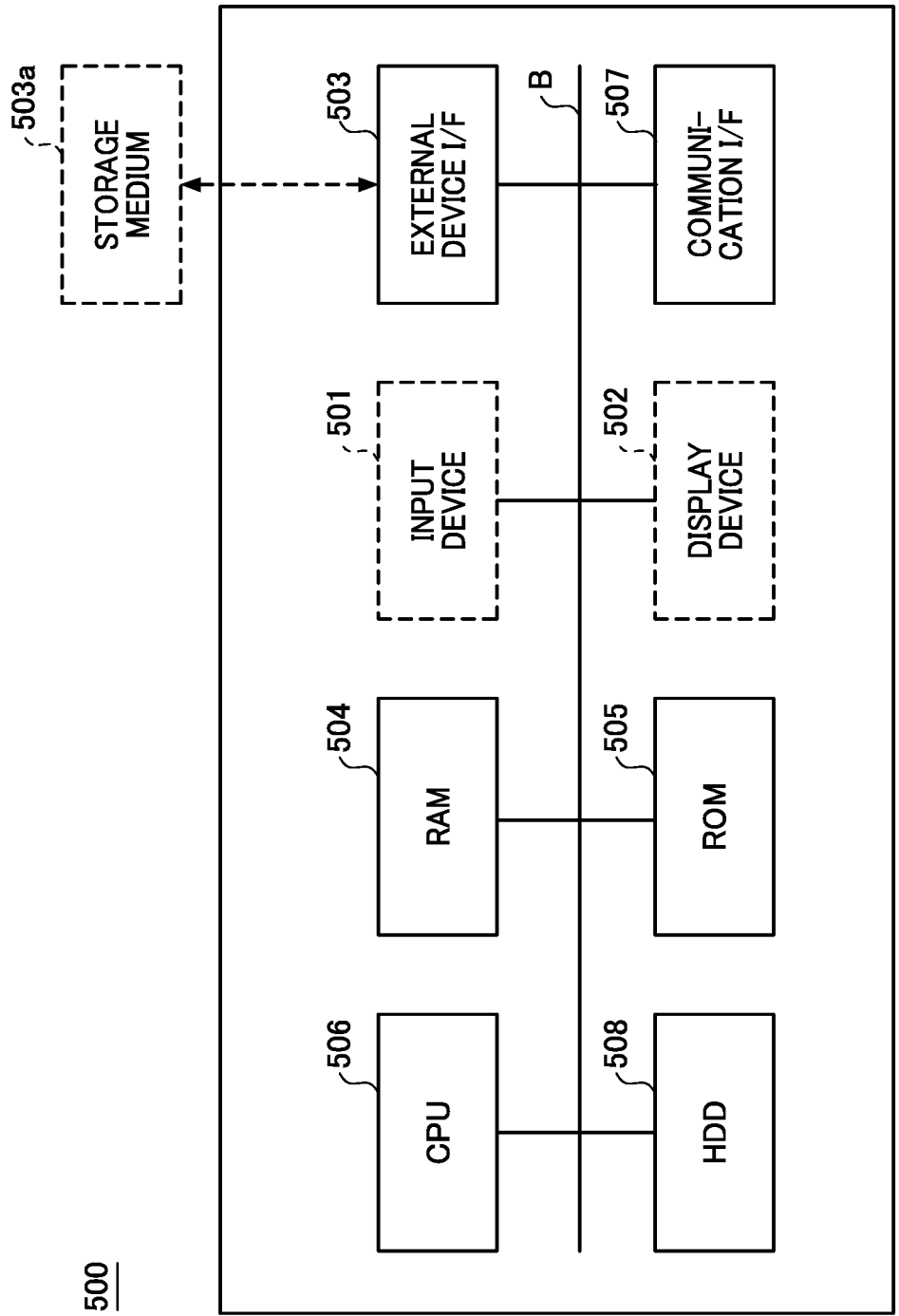
FIG. 2 is a block diagram illustrating a hardware configuration of a computer according to embodiments of the present disclosure.

One or more information processing apparatuses that implement the PC 18, the counter storage device 20, and the display data generating device 40 in FIG. 1 are implemented by a computer having a hardware configuration as illustrated for example in FIG. 2.

FIG. 2 is a block diagram illustrating a hardware configuration of the computer. As illustrated in FIG. 2, the computer 500 includes an input device 501, a display device 502, an external device interface (UF) 503, a random access memory (RAM) 504, a read only memory (ROM) 505, a central processing unit (CPU) 506, a communication interface (UF) 507, and a hard disc drive (HDD) 508, which are connected to one another via a bus B. Note that the input device 501 and the display device 502 may be connected to the bus B as necessary.

The input device 501 includes a keyboard, a mouse, and a touch panel to enable the user to input various operation signals. The display device 502 displays results of processing performed by the computer 500.

The communication I/F 507 is an interface that connects the computer 500 to various networks. The computer 500 performs data communication via the communication OF 507.

The HDD 508 is an example of a nonvolatile storage device storing program and data. Examples of the program or data stored in the HDD 508 include an operating system (OS) as basic software for controlling an entire operation of the computer 500 and application software providing various functions on the OS. The application software may be referred to as an "application" hereinafter, in order to simplify description. The computer 500 may include, instead of or in addition to the HDD 508, a drive device such as a solid state drive (SSD) that uses a flash memory as a storage medium.

The external device I/F 503 is an interface that connects the computer 500 to an external device. Examples of the external device include a storage medium 503*a*. The external device I/F 503 enables the computer 500 to read or write data from or to the storage medium 503*a*. Examples of the storage medium 503*a* include a flexible disc, a compact disc (CD), a digital versatile disc (DVD), a secure digital (SD) memory card, and a universal serial bus (USB) memory.

The ROM 505 is an example of a nonvolatile semiconductor memory (storage) capable of storing the program and data even when the power is not supplied. The ROM 505 stores program and data such as a basic input output system (BIOS), which is executed when the computer 500 starts up, OS settings, and network settings. The RAM 504 is an example of a volatile semiconductor memory (storage device) that temporarily stores program and data.

The CPU 506 loads program or data from a storage device such as the ROM 505 and the HDD 508 onto the RANI 504 and executes processes to implement entire control of the computer 500 or functions of the computer 500. The PC18, the counter storage device 20, and the display data generating device 40 implement various processing as described below with the hardware configuration of the computer 500 as illustrated for example in FIG. 2.

MFP

Figure 3:
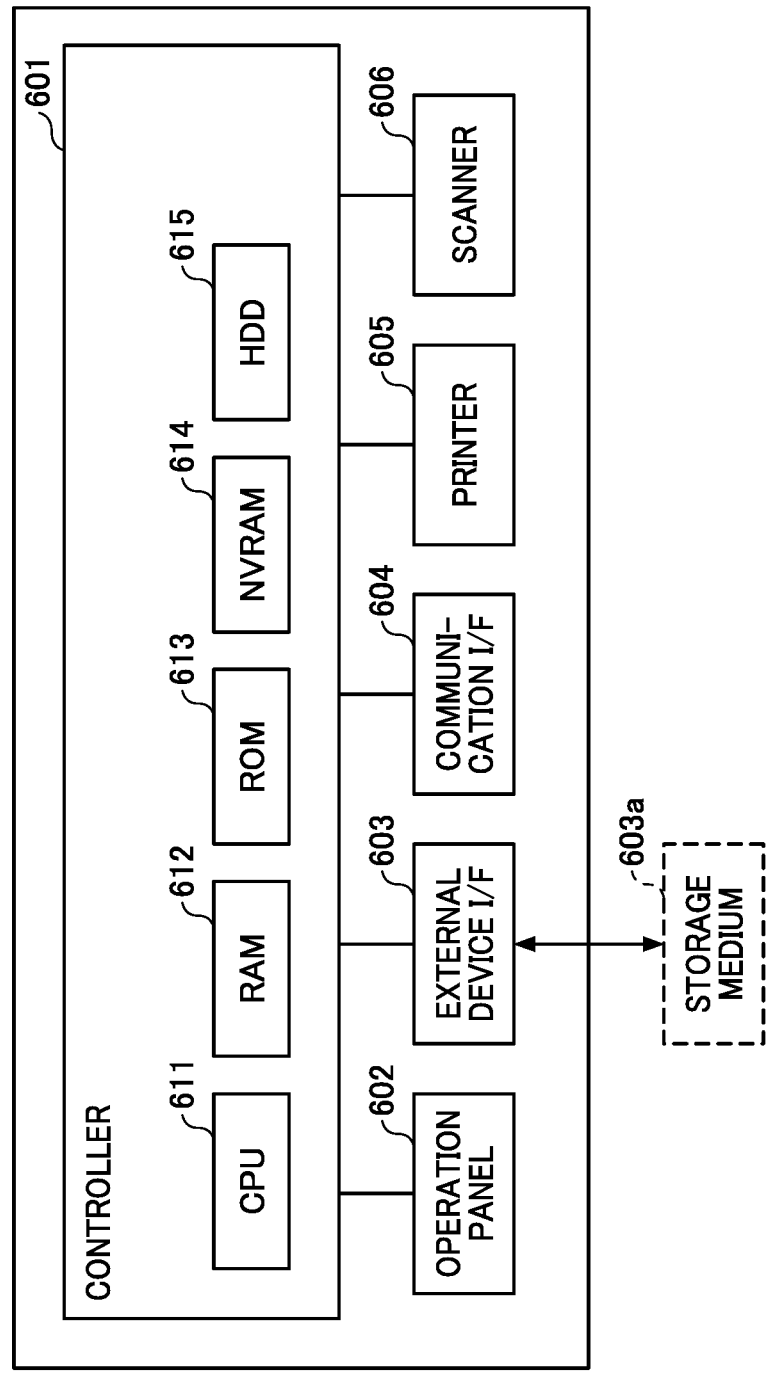
FIG. 3 is a block diagram illustrating a hardware configuration of a multifunction peripheral (MFP), according to embodiments of the present disclosure.

The MFP 10 has a hardware configuration as illustrated for example in FIG. 3. As illustrated in FIG. 3, the MFP 10 includes a controller 601, an operation panel 602, an external device I/F 603, a communication I/F 604, a printer 605, and a scanner 606.

The controller 601 includes the CPU 611, the RAM 612, the ROM 613, a non-volatile random-access memory (NVRAM) 614, and the HDD 615. The ROM 613 stores various programs and data. The RANI 612 temporarily stores program and data. The NVRAM 614 stores, for example, setting information. The HDD 615 stores various programs and data.

The CPU 611 performs processes according to the program, data, setting information, etc., read from the ROM 613, the NVRAM 614, the HDD 615, etc., onto the RAM 612 to control an entire operation of the MFP 10 and implement functions of the MFP 10.

The operation panel 602 includes an input device that receives a user input, and a display device that displays various information. The external device OF 603 is an interface with an external device. Examples of the external device include a storage medium 603*a*. The external device OF 603 enables the MFP 10 to read and write data from and to the storage medium 603*a*. Examples of the storage medium 603*a* include an integrated circuit (IC) card, the flexible disc, the CD, the DVD, the SD memory card, the USB memory and the like.

The communication OF 604 is an interface to connect the MFP 10 to the network 70. The MFP 10 performs data communication via the communication I/F 604. The printer 605 is a printing device that forms an image on a conveyed medium in accordance with print data. Examples of the conveyed medium include paper, coated paper, thick paper, overhead projector (OHP) transparencies, plastic films, prepreg, and copper foil. The scanner 606 is a reading device that scans a document to obtain image data (electronic data). A description of the hardware configuration of the electronic device 12 in FIG. 1 is omitted. In the present embodiment, an example in which the PC 18 or the MFP 10 displays the report generated by the display data generating device 40 is described, however, the display data generated by the display data generating device 40 may be displayed on the electronic device 12 including the input device that accepts input from the user and the display device that performs display.

[Functional Configuration]

Counter Storage Device

Figure 4:
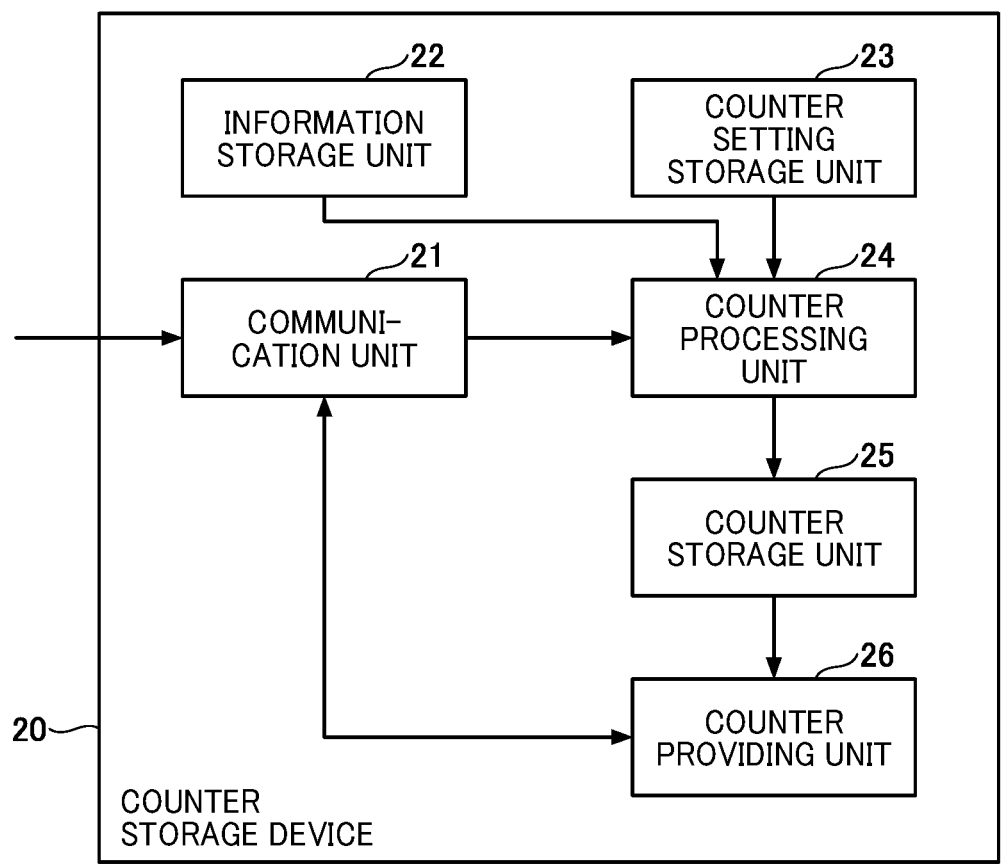
FIG. 4 is a block diagram illustrating a functional configuration of a counter storage device according to embodiments of the present disclosure.

FIG. 4 is a block diagram illustrating a functional configuration of the counter storage device 20 according to the present embodiment. The functions of the counter storage device 20 illustrated in FIG. 4 are implemented by the CPU 506 executing the program stored on any desired memory such as the ROM 505.

As illustrated in FIG. 4, the counter storage device 20 includes a communication unit 21, an information storage unit 22, a counter setting storage unit 23, a counter processing unit 24, a counter storage unit 25, and a counter providing unit 26. The communication unit 21, which is implemented by instructions from the CPU 506 that operates in cooperation with the communication I/F 507, performs data communication with the outside. For example, the communication unit 21 performs data communication with the MFP 10, the intermediary device 14, and the display data generating device 40.

The information storage unit 22 stores customer information and device information, which are described later. With the customer information and the device information, it is possible to identify the MFP 10 or the electronic device 12 installed in the customer environment and identify daily data and monthly data of the MFP 10 or the electronic device 12. The counter setting storage unit 23 stores a counter setting which is described later. The counter processing unit 24 stores the counter data according to the counter setting stored in the counter setting storage unit 23. The counter processing unit 24 stores the daily data and the monthly data for each of the MFP 10 or the electronic device 12 in the counter storage unit 25, based on the counter setting. In addition, the counter processing unit 24 may store the daily data and the monthly data for each customer environment in the counter storage unit 25.

The counter storage unit 25 stores the daily data and the monthly data for each of the MFP 10 or the electronic device 12. The counter storage unit 25 may also store the daily data and the monthly data for each customer environment.

The counter providing unit 26 provides the daily data and the monthly data for the specified MFP 10 or the specified electronic device 12 stored in the counter storage unit 25, in response to a request from the display data generating device 40 specifying the identification information of the MFP 10 or the electronic device 12. The counter providing unit 26 may provide the daily data and the monthly data for the specified customer environment stored in the counter storage unit 25, in response to the request from the display data generating device 40 specifying the identification information of the customer. Further, the counter providing unit 26 may provide the daily data and the monthly data for the customer environment corresponding to the identification information of the specified MFP 10 or the specified electronic device 12, in response to the request from the display data generating device 40 specifying the identification information of the MFP 10 or the electronic device 12.

MFP

Figure 5:
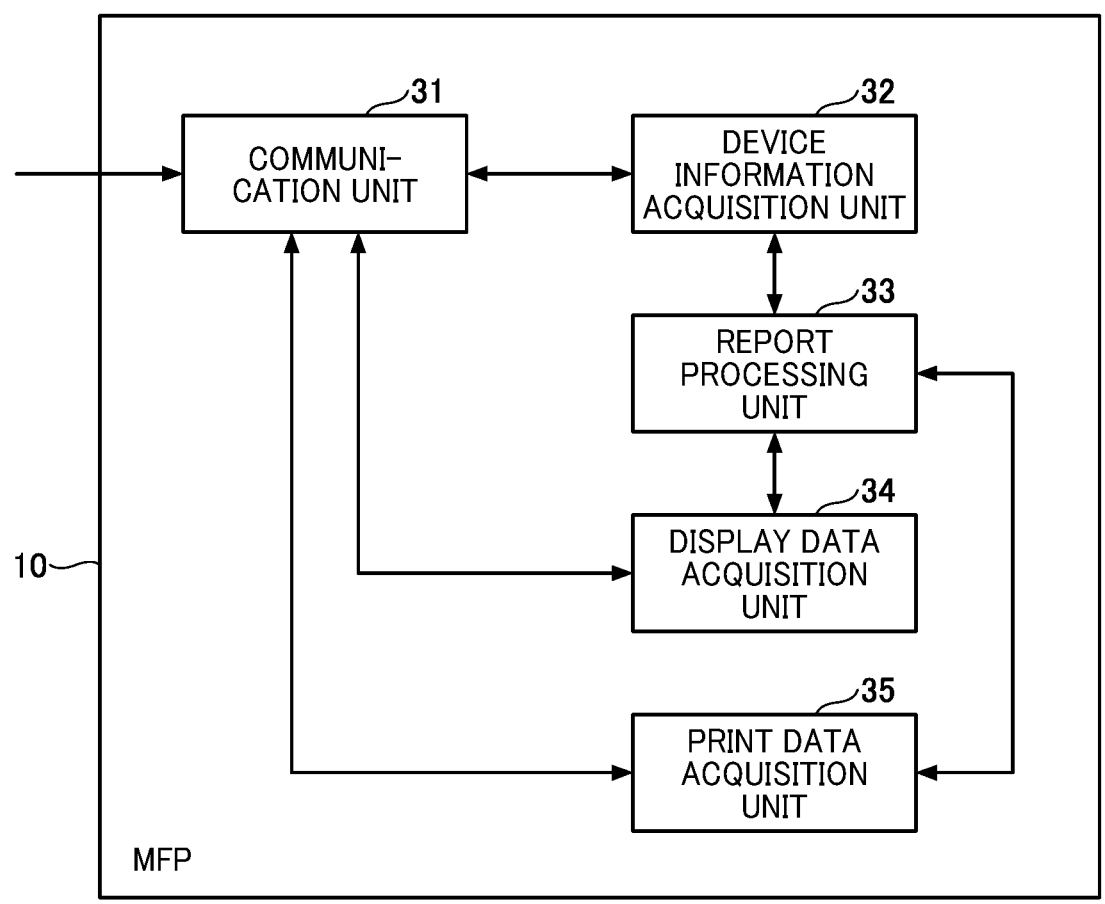
FIG. 5 is a block diagram illustrating a functional configuration of the MFP according to embodiments of the present disclosure.

The MFP 10 according to the present embodiment is implemented by functional blocks, as illustrated for example in FIG. 5. The MFP 10 implements the functional blocks as illustrated in FIG. 5 by the CPU 611 executing the program stored in any desired memory such as the ROM 613.

The MFP 10 includes the communication unit 31, a device information acquisition unit 32, a report processing unit 33, a display data acquisition unit 34, and a print data acquisition unit 35 as illustrated in FIG. 5. The communication unit 31 performs, which is implemented by instructions of the CPU 611 that operates in cooperation with the communication OF 604, data communication with the outside. For example, the communication unit 31 exchanges data with the electronic device 12, the intermediary device 14, the counter storage device 20 and the display data generating device 40.

The device information acquisition unit 32 acquires device information such as a serial number (device identification (ID)) and a media access control (MAC) address from the device (MFP 10). The device information is an example of identification information of the device. Further, the device information acquisition unit 32 acquires information indicating that the device type is the MFP. The report processing unit 33 causes the operation panel 602 to display the report of, for example, the daily data or the monthly data of the MFP 10 or the electronic device 12 based on the display data acquired from the display data generating device 40. In addition, the report processing unit 33 causes the printer 605 to print the report displayed on the operation panel 602.

The display data acquisition unit 34 acquires the display data from the display data generating device 40 and provides the display data to the report processing unit 33. The print data acquisition unit 35 acquires the print data of the report displayed on the operation panel 602 from the display data generating device 40 and provides the print data to the report processing unit 33.

Display Data Generating Device

Figure 6:
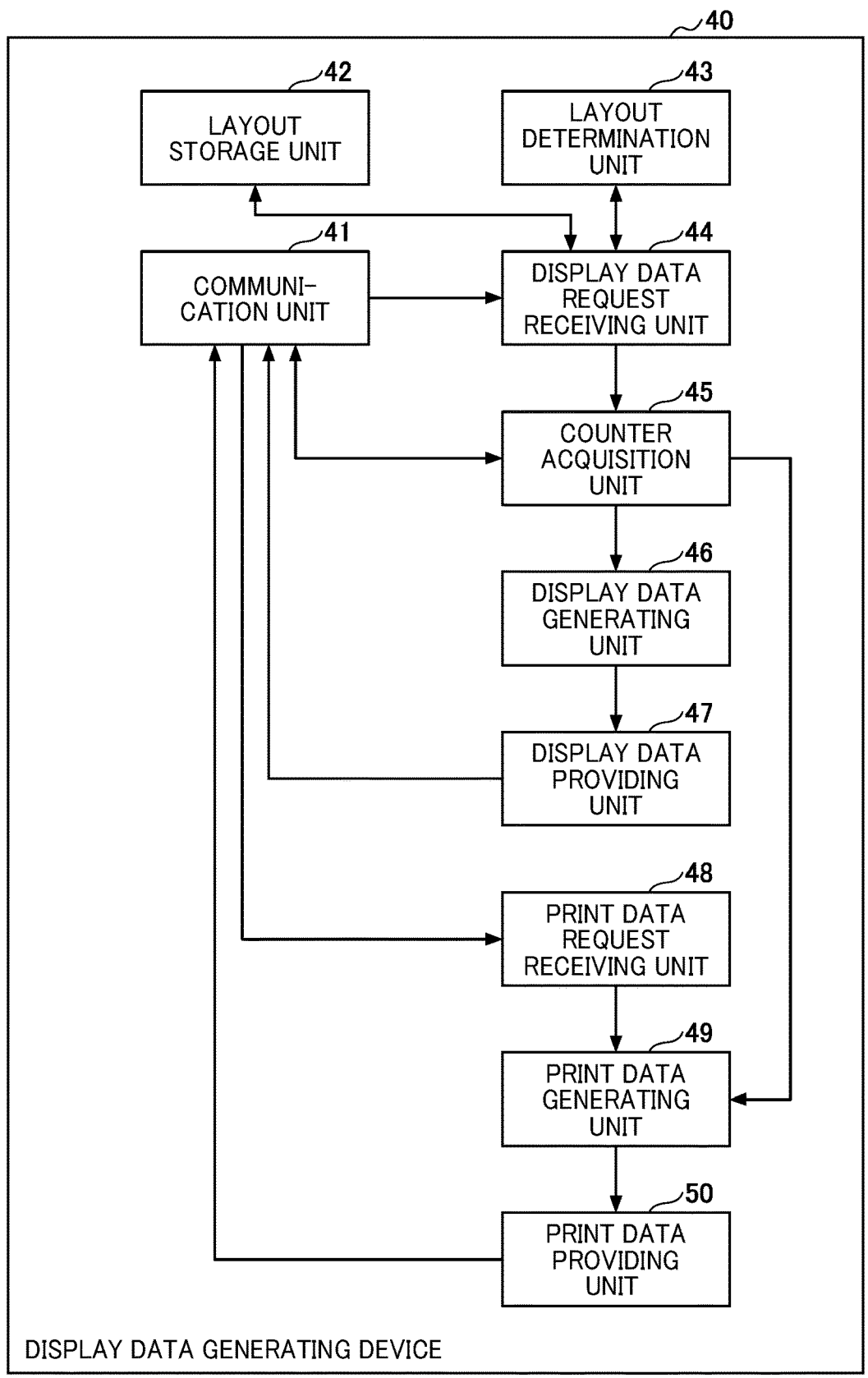
FIG. 6 is a block diagram illustrating a functional configuration of a display data generating device according to embodiments of the present disclosure.

The display data generating device 40 according to the present embodiment is implemented by the functional blocks as illustrated for example in FIG. 6. The display data generating device 40 implements the functional blocks as illustrated in FIG. 6 by the CPU 506 executing the program stored in any desired memory such as the ROM 505.

The display data generating device 40 illustrated in FIG. 6 includes a communication unit 41, a layout storage unit 42, a layout determination unit 43, a display data request receiving unit 44, a counter acquisition unit 45, a display data generating unit 46, a display data providing unit 47, a print data request receiving unit 48, a print data generating unit 49, and a print data providing unit 50.

The communication unit 41, which is implemented by instructions from the CPU 506 that operates in cooperation with the communication OF 507, performs data communication with the outside. For example, the communication unit 41 performs data communication with the MFP 10, the PC 18, and the counter storage device 20. The layout storage unit 42 stores an optimum user-friendly layout in terms of user operability and visibility in association with each of the MFP 10, the electronic device 12, or the PC 18 by taking into consideration the size of the display screen and the operation method. More specifically, the layout storage unit 42 may store the optimum user-friendly layout in terms of user operability and visibility in association with the display area size of the display screen and the operation method for each device. For example, the layout storage unit 42 stores first layout information for the MFP 10, and second layout information for the PC 18.

The layout determination unit 43 uses the layout information stored in the layout storage unit 42 to determine the optimum user-friendly layout for the MFP 10, the electronic device 12 or the PC 18, in response to the display data request from the MFP 10, the electronic device 12 or the PC 18. The display data request receiving unit 44 receives the display data request from the MFP 10, the electronic device 12 or the PC 18. The counter acquisition unit 45 acquires the counter data from the counter storage device 20.

The display data generating unit 46 generates the display data based on the layout determined by the layout determination unit 43 and using the counter data acquired from the counter storage device 20. The display data providing unit 47 provides the generated display data to the MFP 10, the electronic device 12, or the PC 18 which requested the display data.

The print data request receiving unit 48 receives a print data request from the MFP 10 or the electronic device 12 having the print function. The print data generating unit 49 generates print data in response to the print data request from the MFP 10 or the electronic device 12 having the print function. The print data providing unit 50 provides the generated print data to the MFP 10 or the electronic device 12 having the print function, which requested the print data.

Setting, Data, and Information

FIG. 7 is an illustration of counter settings according to the present embodiment. The counter setting includes a device ID, a MAC address, a daily data ID, a monthly data ID, and a monthly data calculation date as items. The device ID is an example of device information acquired from the device. The MAC address is an example of device information for identifying the MFP 10 or the electronic device 12 on the network. The daily data ID is an example of identification information for identifying the daily data of the MFP 10 or the electronic device 12 specified by the device ID or the MAC address. The monthly data ID is an example of identification information for identifying the monthly data of the MFP 10 or the electronic device 12 specified by the device ID or the MAC address. The monthly data calculation date indicates a calculation date for generating the monthly data.

FIG. 8 is an illustration of a configuration of the daily data according to the present embodiment. The daily data includes a daily data ID, a date (year/month/date), and various counter data as items. The daily data ID is an example of identification information for identifying the daily data. The date is a date on which the counter data of the corresponding daily data is counted. The various counter data are daily counter data of different types, such as a total counter, a counter for each function, a counter for each color, and a counter for each paper size.

FIG. 9 is an illustration of a configuration of the monthly data according to the present embodiment. The monthly data includes a monthly data ID, the date (year/month/date), and various counter data as items. The monthly data ID is an example of identification information for identifying the monthly data. The date is a date on which the counter data of the corresponding monthly data is counted. The various counter data are monthly counter data of different types, such as a total counter, a counter for each function, a counter for each color, and a counter for each paper size.

FIG. 10 is an illustration of a configuration of the customer information according to the present embodiment. The customer information includes a customer ID, a name, an address, a phone number, and an e-mail address as items. The customer ID is an example of identification information for identifying the customer. The name, the address, the phone number, and the e-mail address are respectively the customer's name, the customer's address, the customer's phone number, and the customer's e-mail address. The customer information is used, for example, for displaying the customer's name, address, phone number and e-mail address on the report.

FIG. 11 is an illustration of a configuration of the device information according to the present embodiment. The device information includes the device ID, the customer ID, the MAC address, the daily data ID, and the monthly data ID as items. With the use of device information that associates the customer ID with the device ID and the MAC address, the customer environment can be associated with the MFP 10 and the electronic device 12 in the customer environment.

The customer can be associated with the daily data and the monthly data of the customer, with the use of device information that associates the customer ID with the daily data ID and the monthly data ID. The MFP 10 and the electronic device 12 are associated with the daily data and the monthly data of the MFP 10 and the electronic device 12 with the use of device information that associates the device ID and the MAC address with the daily data ID and the monthly data ID.

[Processing]

Counter Storage Processing

Figure 12:
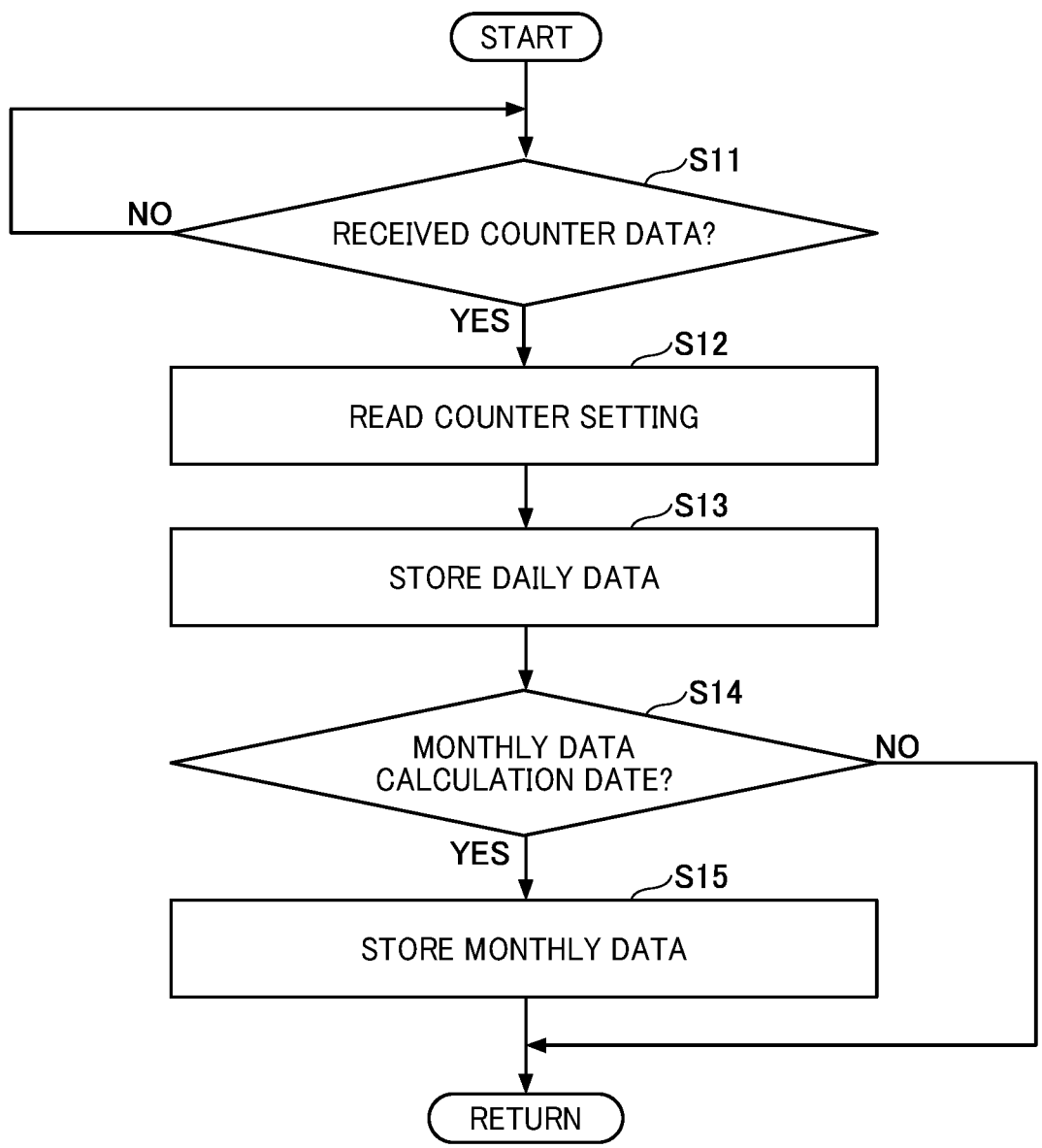
FIG. 12 is a flowchart illustrating a counter storage process according to embodiments of the present disclosure.

The counter storage device 20 of the information processing system 1 according to the present embodiment performs counter accumulation processing according to the flowchart illustrated as an example in FIG. 12.

In step S11, the counter processing unit 24 of the counter storage device 20 waits until the counter processing unit 24 receives the counter data from the MFP 10 or the intermediary device 14 in the customer environment. In step S12, in response to receiving the counter data, the counter processing unit 24 of the counter storage device 20 reads the counter setting as illustrated in FIG. 7 from the counter setting storage unit 23.

In step S13, the counter processing unit 24 generates the daily data by adding the daily data ID to the counter data received in step S12 and stores the daily data in the counter storage unit 25.

In step S14, the counter processing unit 24 determines whether the monthly data calculation date has passed based on the counter setting that is read in step S12. If the monthly data calculation date has not passed ("NO" in step S14), the counter processing unit 24 skips step S15 and the process returns to step S11.

If the monthly data calculation date has passed ("YES" in step S14), the counter processing unit 24 generates the monthly data based on the daily data for one month in step S15. In step S15, the counter processing unit 24 stores a record of the generated monthly data in the counter storage unit 25.

In the flowchart illustrated in FIG. 12, the monthly data is generated from the daily data when the monthly data calculation date of the customer has passed and after the daily data is stored in the counter storage unit 25. However, the counter processing unit 24 may generate the monthly data from the daily data in response to the request of the monthly data from the MFP 10. Further, the counter processing unit 24 may generate weekly data instead of the monthly data.

Report Display Processing and Print Processing

Figure 13:
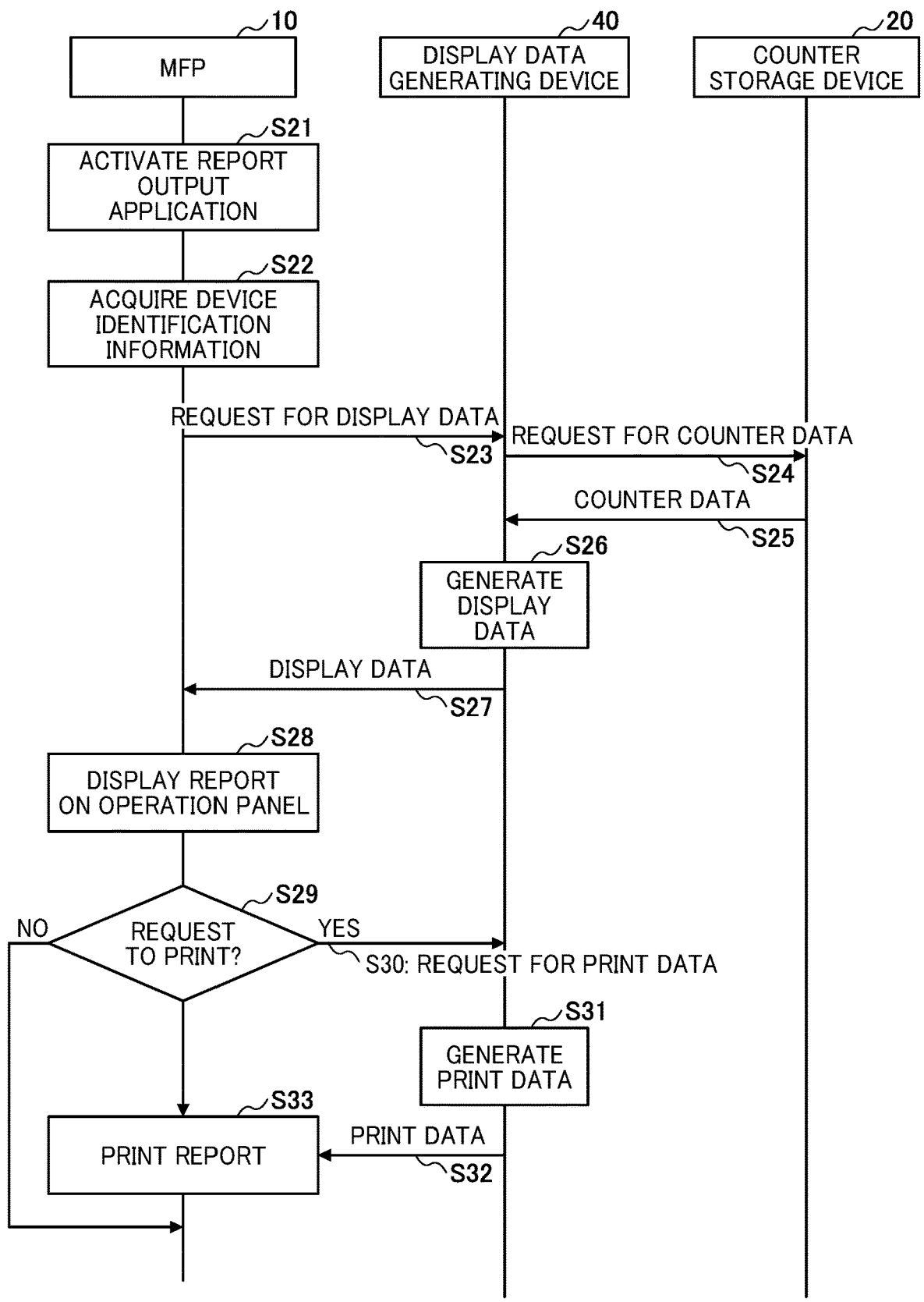
FIG. 13 is a sequence diagram illustrating a report displaying and printing process according to embodiments of the present disclosure.

The information processing system 1 according to the present embodiment performs report display processing and print processing according to a sequence diagram such as that illustrated in FIG. 13. The sequence diagram of FIG. 13 illustrates an example in which the user operates the MFP 10. A description of an example in which the user operates the PC 18 is deferred.

Figure 14:
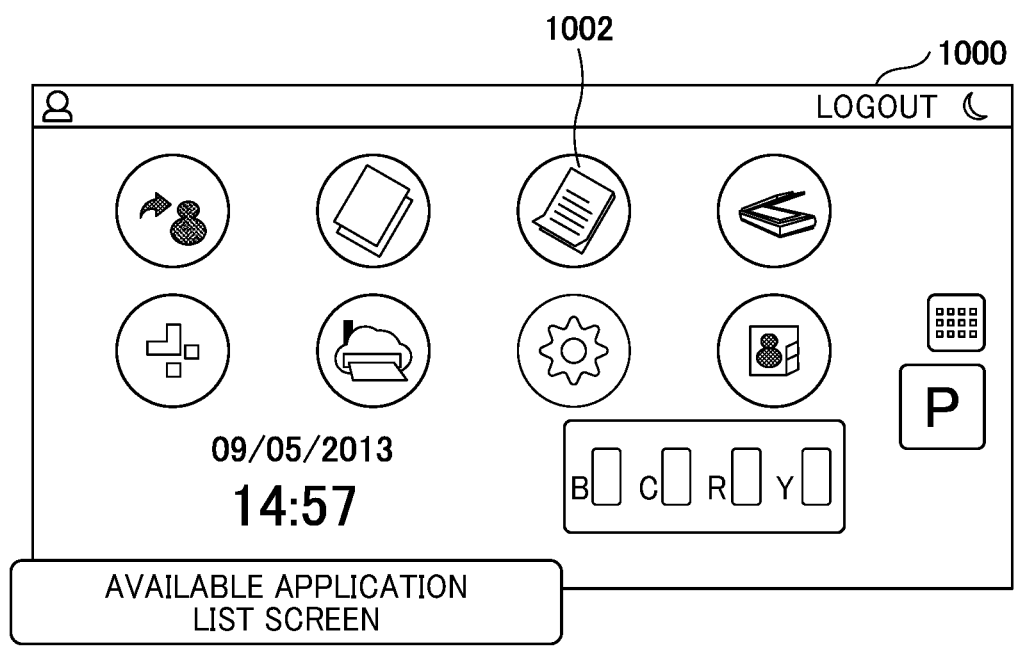
FIG. 14 is a conceptual diagram illustrating a menu of supported applications according to embodiments of the present disclosure.

In step S21, for example, the MFP 10 activates a report output application according to an operation by a user such as an administrator of the customer environment. The report output application may be activated by the user by selecting an icon 1002 of the report output application from a menu of supported applications 1000 displayed on the operation panel 602, as illustrated for example in FIG. 14.

In step S22, the device information acquisition unit 32 of the MFP 10 acquires the device information including the device identification information such as the device ID or the MAC address and information indicating that the device type is the MFP, from an internal memory of the MFP 10. In step S23, the display data acquisition unit 34 of the MFP 10 sends the display data request to the display data generating device 40, designating the device information and the information indicating that the device type is the MFP, each acquired by the device information acquisition unit 32.

The display data request receiving unit 44 of the display data generating device 40 receives the display data request from the MFP 10. In step S24, the counter acquisition unit 45 of the display data generating device 40 requests the counter storage device 20 to provide the counter data such as the daily data and the monthly data designating the device information of the MFP 10 which requested the display data.

The counter providing unit 26 of the counter storage device 20 reads counter data corresponding to the device information from the counter storage unit 25 in response to the counter data request from the display data generating device 40 designating the device information. In step S25, the counter providing unit 26 returns counter data corresponding to the device information to the display data generating device 40. The counter acquisition unit 45 of the display data generating device 40 acquires the counter data from the counter storage device 20.

In step S26, the layout determination unit 43 of the display data generating device 40 uses the layout information stored in the layout storage unit 42 and determines an optimum layout in terms of user operability and visibility in the MFP 10 which requested the display data. The display data generating unit 46 generates the display data using the counter data acquired from the counter storage device 20 and the layout determined by the layout determination unit 43.

Figure 15A:
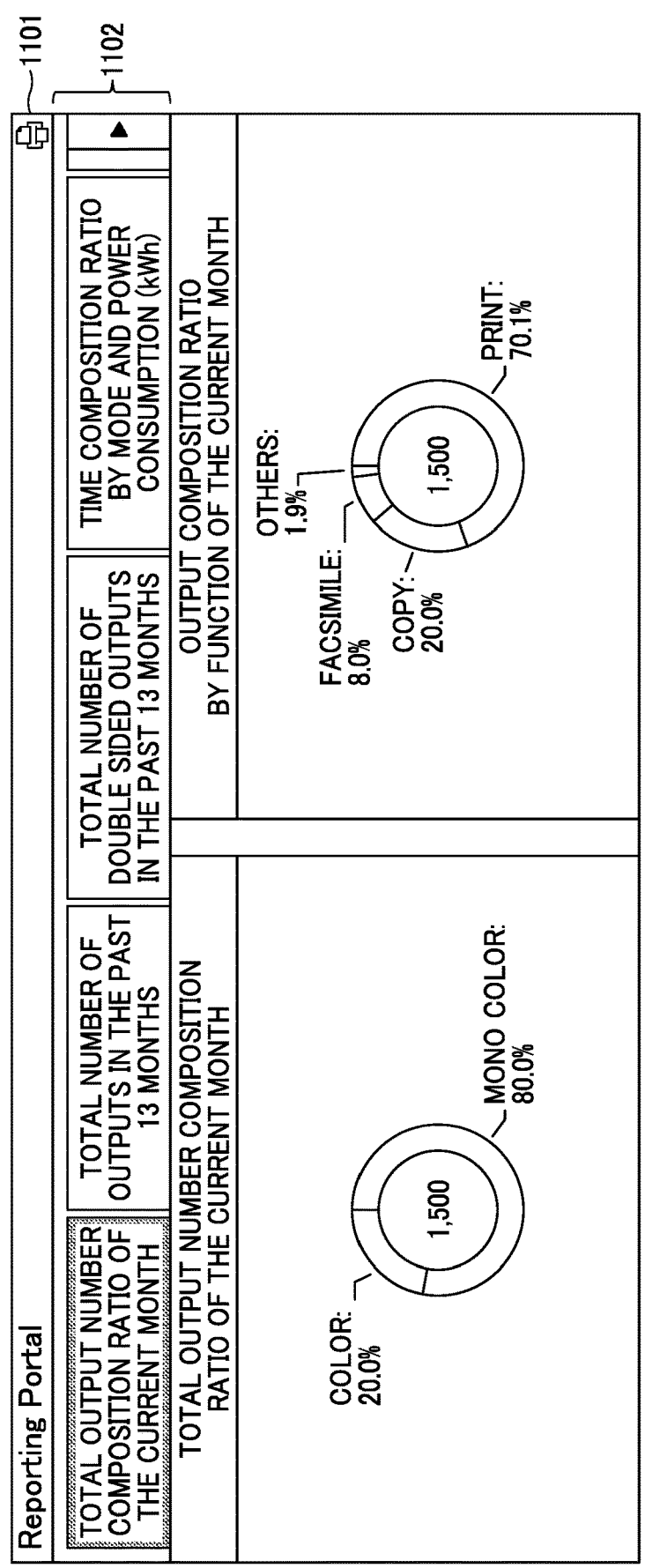
FIGS. 15A to 15C are conceptual diagrams illustrating reports displayed on an operation panel according to embodiments of the present disclosure.
Figure 15B:
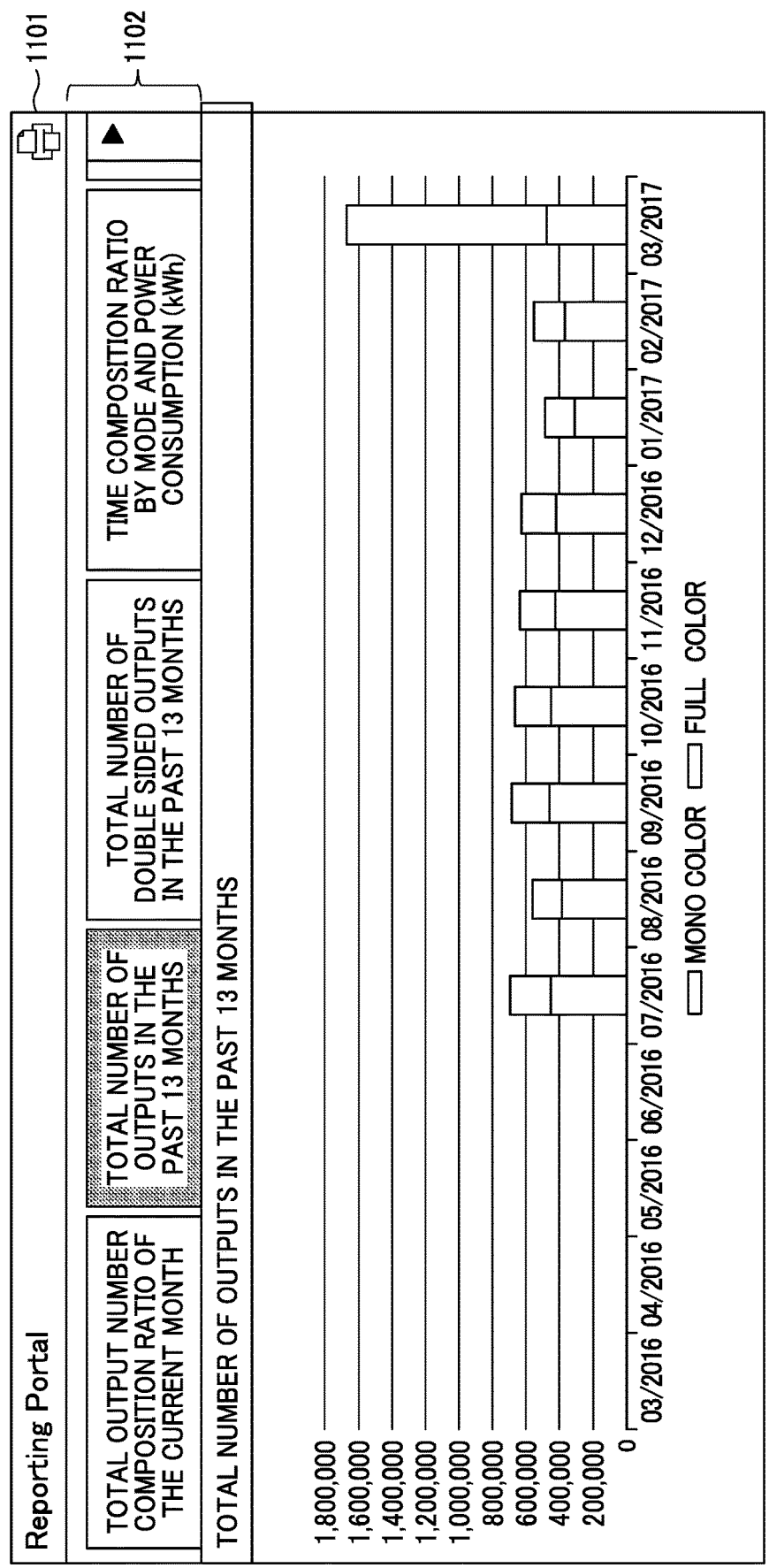
Figure 15C:
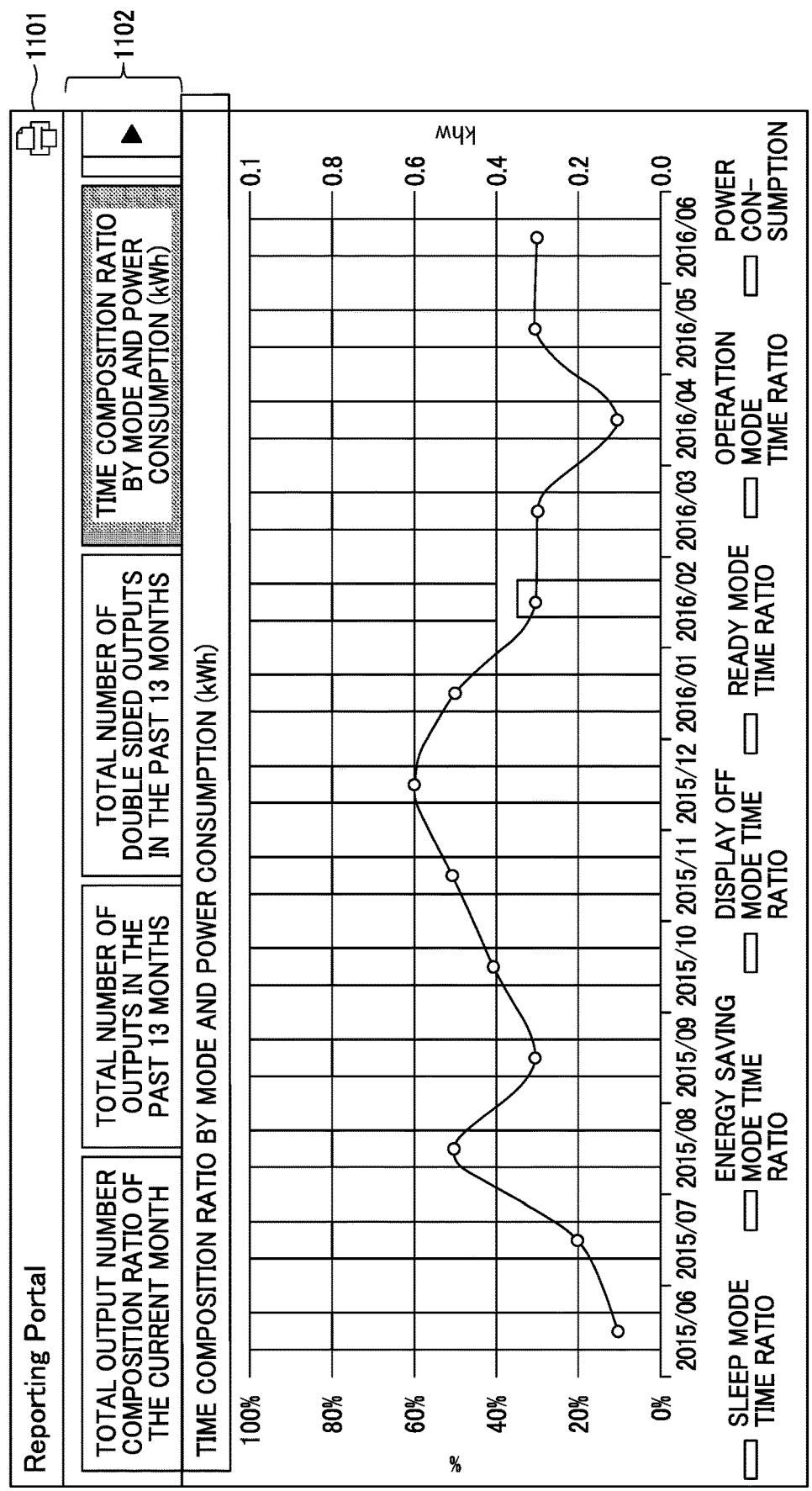

In step S27, the display data providing unit 47 of the display data generating device 40 provides the display data generated by the display data generating unit 46 to the MFP 10 which requested the display data. The display data acquisition unit 34 of the MFP 10 acquires the display data from the display data generating device 40 and provides the display data to the report processing unit 33. The report processing unit 33 displays the report on the operation panel 602 based on the provided display data as illustrated as examples in FIGS. 15A to 15C. FIGS. 15A to 15C are conceptual diagrams illustrating examples of the report displayed on the operation panel according to the present embodiment.

FIGS. 15A to 15C illustrate how the display contents of the report (such as the graphs and the tables based on the counter data) are switched by a tab 1102. As illustrated in FIGS. 15A to 15C, the layout of the report for the MFP has a configuration that fits within the display area size of the operation panel 602, and since the display content can be switched by the tab 1102, it is not necessary to scroll the screen.

As examples of the types of report, total output number composition ratio of the current month, total number of outputs in the past 13 months, total number of double sided outputs in the past 13 months, and time composition ratio by mode and power consumption switched by the tab 1102 are illustrated in FIGS. 15A to 15C.

Further, in the reports of FIGS. 15A to 15C, a print button 1101 is provided. The user can issue a report print request to the MFP 10 by pressing the print button 1101. In step S29, the print data acquisition unit 35 determines whether the report print request has been received from the user. In response to the report print request from the user, the print data acquisition unit 35 requests the print data of the report displayed on the operation panel 602 from the display data generating device 40.

The print data request receiving unit 48 of the display data generating device 40 receives the print data request from the MFP 10. In step S31, the print data generating unit 49 of the display data generating device 40 generates the print data of the report requested from the MFP 10. In step S32, the print data providing unit 50 of the display data generating device 40 provides the print data generated by the print data generating unit 49 to the MFP 10.

In step S33, the print data acquisition unit 35 of the MFP 10 provides the print data acquired from the display data generating device 40 to the report processing unit 33. The report processing unit 33 causes the printer 605 to print the provided print data. Note that the report printed by pressing the print button 1101 may be only the report displayed on the operation panel 602 by the operation of the tab 1102 or all the reports that can be displayed on the operation panel 602 by the operation of the tab 1102.

In step S23, the display data acquisition unit 34 of the MFP 10 may designate the device information of another electronic device 12 specified by the user and acquire the display data for the MFP 10 from the display data generating device 40. In this case, in step S28, the MFP 10 does not display the report of the MFP 10 but the report of another electronic device 12.

Further, in step S23, the display data acquisition unit 34 of the MFP 10 may specify the customer ID designated by the user and acquire the display data for the MFP from the display data generating device 40. In this case, in step S28, the MFP 10 displays the reports of the MFP 10 and the electronic device 12 installed in the customer environment.

Various methods can be conceived for the user to designate the device information of the electronic device 12. For example, the MFP 10 may acquire the device identification information from the electronic device 12 connected to the network 70 and the user may select by the device identification information. For example, the MFP 10 may request the device identification information from the electronic device 12 connected to the network 70 by broadcasting or multicasting and acquire the device identification information from the electronic device 12. In another example, the MFP 10 may allow the user to input the device identification information of the electronic device 12.

Figure 16:
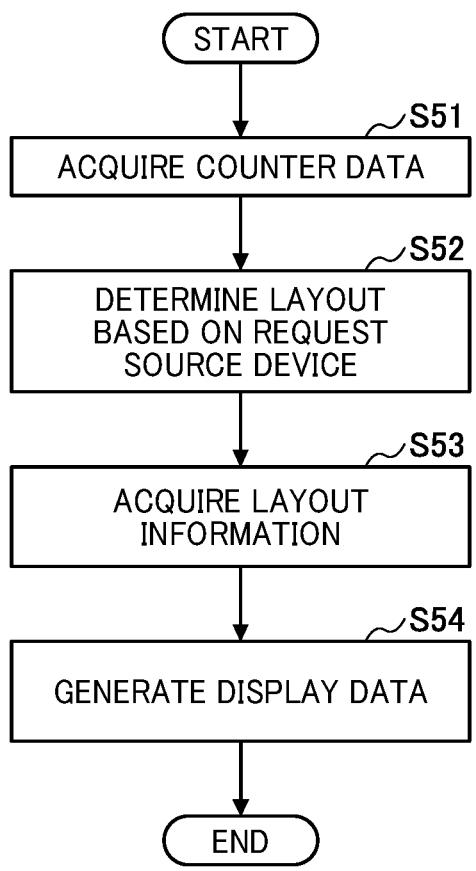
FIG. 16 is a flowchart illustrating a display data generating process according to embodiments of the present disclosure.

The display data generating device 40 generates the display data as illustrated for example in a flowchart of FIG. 16. In step S51, the counter acquisition unit 45 of the display data generating device 40 specifies the device information of the MFP 10 that requested the display data and acquires the counter data such as the daily data and the monthly data from the counter storage device 20.

In step S52, the layout determination unit 43 uses the layout information stored in the layout storage unit 42 and determines the layout of the report based on the source of the display data request. For example, the layout determination unit 43 may make the determination based on the device type of the request source or may make the determination based on the display area size of the display screen and the operation method. More specifically, when the MFP 10 or the electronic device 12 that requested the display data is provided with a small display screen and input/output devices are not suitable for scrolling the display screen, the layout determination unit 43 determines the layout as illustrated as examples in FIGS. 15A to 15C as the suitable layout.

In step S53, the display data generating unit 46 acquires the layout information (for example, HyperText Markup Language (HTML) data) of the layout determined in step S52. Then, in step S54, the display data generating unit 46 generates display data based on the acquired layout information and the counter data acquired from the counter storage device 20.

Figure 17:
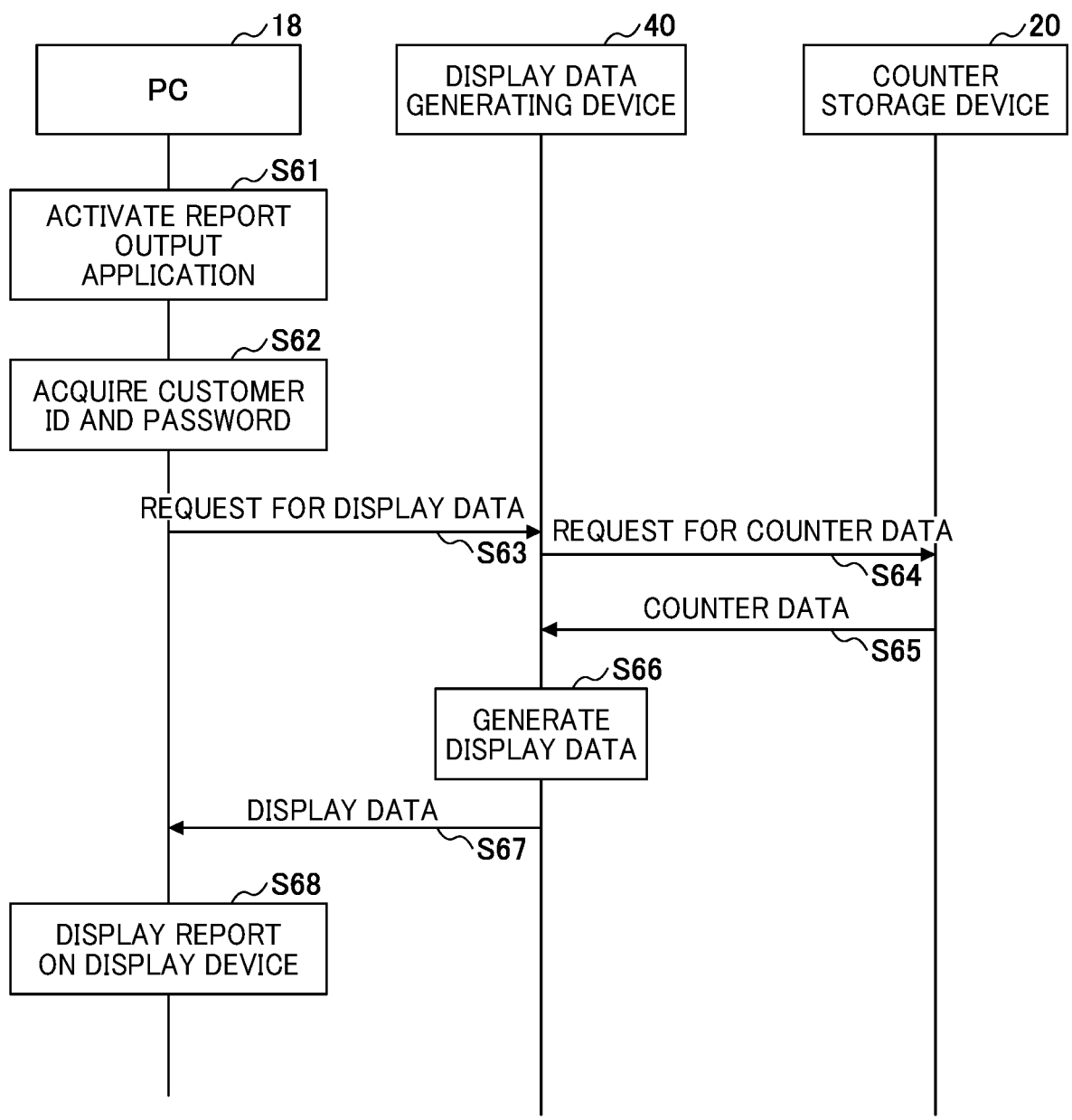
FIG. 17 is a sequence diagram illustrating a report displaying process according to embodiments of the present disclosure.

When the user operates the PC 18, the information processing system 1 according to the present embodiment performs the report display processing according to a sequence diagram illustrated as an example in FIG. 17.

In step S61, for example, the user such as the administrator of the customer environment activates the report output application on the PC 18. Activation of the report output application can be done by selecting the icon of the report output application displayed on the display device 502. In step S62, the PC 18 acquires a customer ID and a password by the user's input. The PC 18 may acquire the customer ID and the password by reading the preset customer ID and password in advance.

In step S63, the PC 18 requests the display data generating device 40 for the display data designating the customer ID and the password acquired in step S62 and information indicating that the device type is the MFP.

The display data request receiving unit 44 of the display data generating device 40 receives the display data request from the PC 18. In step S64, the counter acquisition unit 45 of the display data generating device 40 requests the counter storage device 20 to acquire the counter data such as the daily data and the monthly data designating the customer ID.

The counter providing unit 26 of the counter storage device 20 reads the counter data corresponding to the customer ID from the counter storage unit 25, in response to the counter data request from the display data generating device 40 designating the customer ID. In step S65, the counter providing unit 26 returns the counter data corresponding to the customer ID to the display data generating device 40. The counter acquisition unit 45 of the display data generating device 40 acquires the counter data from the counter storage device 20.

In step S66, the layout determination unit 43 of the display data generating device 40 uses the layout information stored in the layout storage unit 42 and determines an optimum layout in terms of user operability and visibility in the PC 18 which requested the display data. The display data generating unit 46 generates the display data using the counter data acquired from the counter storage device 20 and the layout determined by the layout determination unit 43.

Figure 18:
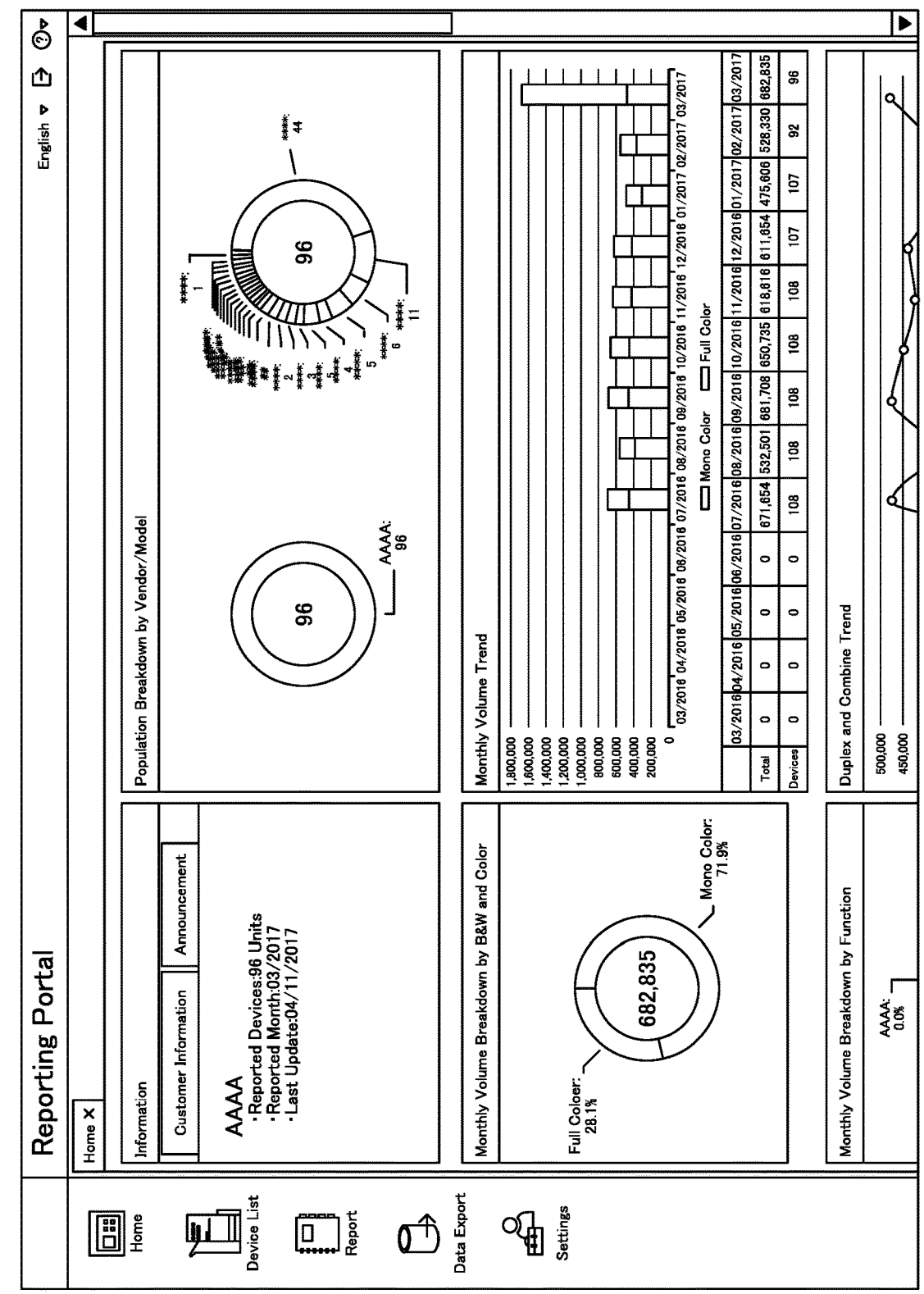
FIG. 18 is a conceptual diagram illustrating a report displayed on a personal computer (PC) display according to embodiments of the present disclosure.

In step S67, the display data providing unit 47 of the display data generating device 40 provides the display data generated by the display data generating unit 46 to the PC 18 that requested the display data. In step S68, the PC 18 displays the report as illustrated for example in FIG. 18 on the display device 502 based on the display data acquired from the display data generating device 40. FIG. 18 is a conceptual diagram illustrating an example of the report displayed on the display device 502 of the PC 18 according to the present embodiment.

As illustrated in FIG. 18, because the display area size of the display device 502 such as a display for the PC 18 is often larger than the operation panel 602 of the MFP 10, the layout of the report may include a plurality of types of graphs and may require scrolling the screen to view all of the report.

In step S63, the PC 18 may designate the device information of the MFP 10 or the electronic device 12 specified by the user and acquire the display data for the PC 18 from the display data generating device 40. In this case, in step S68, the PC 18 displays a report for each of the MFP 10 and the electronic device 12 instead of the report on the entire MFP 10 and the electronic device 12 installed in the customer environment. The layout of the report for PC as illustrated for example in FIG. 18 includes all types of the report illustrated in FIGS. 15A to 15C and is designed to change the range of display by scrolling the display screen.

As described above, according to the information processing system 1 of the present embodiment, when the source of the display data request is the MFP 10, it is possible to generate the display data in a user-friendly layout on the operation panel 602 of the MFP 10. When the source of the display data request is the PC 18, it is also possible to generate the display data in a user-friendly layout on the display device 502 of the PC 18.

Therefore, according to the information processing system 1 of the present embodiment, it is possible to generate the display data in a user-friendly layout that takes into consideration the request source device of the display data.

Note that the information processing system 1 according to the present embodiment can hold many kinds of counter data for a long period of time without increasing the recording capacity of the MFP 10 or the electronic device 12 by accumulating the counter data in the counter storage device 20 instead of accumulating the counter data in the MFP 10 or the electronic device 12.

Furthermore, the information processing system 1 according to the present embodiment holds the counter data in association with the device identification information of the MFP 10 and the electronic device 12. By requesting the counter data by designating the device identification information of the MFP 10 or the electronic device 12, the MFP 10 can acquire the counter data of the MFP 10 or the electronic device 12 without using other identification information such as the customer ID.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of this disclosure and appended claims.

The MFP 10 is an example of a device described in the claims. The counter storage device 20 is an example of a usage information storage device. The display data generating device 40 is an example of a display data generating device.

In addition, the usage information described in the claims is not limited to the counter data. The usage information described in the claims includes time used, a data amount and a number of captured images, a communication data amount, time of outputting data and an amount of data to be output.

The information processing system 1 described in the above embodiment is just an example, and there may be various system configurations depending on applications or purposes.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

Any one of the above-described operations may be performed in various other ways, for example, in an order different from the one described above.

What is claimed is:

1. A display data generating device, comprising:
a communication interface to connect to an image forming device; and
processing circuitry configured to
receive, from a request source device, a request for display data of usage information of the image forming device, the request including identification information of the image forming device, wherein the usage information includes information indicating an amount of use of the image forming device during a past period of time, and was previously transmitted to and stored in an information storage device, prior to receipt of the request for the display data;
acquire the usage information of the image forming device corresponding to the identification information of the image forming device from the usage information storage device, which stores the usage information of the image forming device in association with the identification information of the device;
using the acquired usage information of the image forming device, generate the display data in a layout optimized for a display on which the request source device displays the usage information of the image forming device; and
provide the generated display data to the request source device,
wherein in response to the request, which is received from an information processing apparatus, and is to provide the display data corresponding to the image forming device, the request including identification information of an organization using the image forming device, the processing circuitry is further configured to acquire the usage information of the image forming device corresponding to the identification information of the organization.

2. The display data generating device of claim 1, wherein the processing circuitry is further configured to:
determine a suitable display layout based on a type of the request source device that transmitted the request for the display data;
acquire layout information of the determined layout; and
generate the display data based on the acquired layout information.

3. The display data generating device of claim 2, wherein:
in response to the request for the display data; which is received from the request source device, the processing circuitry is further configured to generate the display data based on first layout information;
wherein the display data includes a plurality of different display data items, each of the plurality of different display data items corresponding to a size of a display screen of an operation panel of the request source device; and wherein each of the plurality of different display data items can be selected by a tab and displayed on the display screen of the operation panel of the request source device.

4. The display data generating device of claim 3, wherein the plurality of different display data items is a plurality of different graphs or tables generated from the usage information of the image forming device.

5. The display data generating device of claim 2, wherein in response to the request for display data, which is received from the information processing apparatus different from the image forming device, the processing circuitry is further configured to generate the display data based on second layout information;
   wherein the display data includes a plurality of different display data items generated based on first layout information; and
   wherein the display data is generated to allow viewing by scrolling on a display of the information processing apparatus.

6. A display data generating method performed by a computer connectable to an image forming device via a network, the method comprising:
   receiving, from a request source device, a request for display data of usage information of the image forming device, the request including identification information of the image forming device, wherein the usage information includes information indicating an amount of use of the image forming device during a past period of time, and was previously transmitted to and stored in an information storage device, prior to receipt of the request for the display data;
   acquiring the usage information of the image forming device corresponding to the identification information of the image forming device from the usage information storage device, which stores the usage information of the image forming device in association with the identification information of the image forming device;
   using the acquired usage information of the image forming device, generating display data in a layout optimized for a display on which a request source device displays the usage information of the image forming device; and
   providing the generated display data to the request source device,
   wherein in response to the request, which is received from an information processing apparatus, and is to provide the display data corresponding to the image forming device, the request including identification information of an organization using the image forming device, the method further comprises acquiring the usage information of the image forming device corresponding to the identification information of the organization.

7. The display data generating method of claim 6, further comprising:
   determining a suitable display layout based on a type of the request source vice that transmitted the request for the display data;
   acquiring layout information of the determined layout; and
   generating the display data based on the acquired layout information.

8. The display data generating method of claim 7, wherein the generating step includes generating the display data based on first layout information, in response to the request for the display data, which is received from the request source device,
   wherein the display data includes a plurality of different display data items, each of the plurality of different display data items corresponding to a display screen size of an operation panel of the request source device, and
   wherein each of the plurality of different display data items can be selected by a tab and displayed on the display screen of the operation panel of the request source device.

9. The display data generating method of claim 8, wherein the plurality of different display data items is a plurality of different graphs or tables generated from the usage information of the image forming device.

10. The display data generating method of claim 7, wherein in response to the request for the display data, which is received from the information processing apparatus different from the image forming device, the generating step includes generating the display data based on second layout information,
    wherein the display data includes the plurality of different display data items generated based on the first layout information, and
    wherein the display data allows viewing by scrolling on a display of the information processing apparatus.

11. An information processing system, comprising:
    a display data generating device; and
    an image forming device connected to the display data generating device via a network, wherein
    the display data generating device includes first processing circuitry configured to:
       receive, from a request source device, a request for display data of usage information of the image forming device, the request including identification information of the image forming device, wherein the usage information includes information indicating an amount of use of the image forming device during a past period of time, and was previously transmitted to and stored in an information storage device, prior to receipt of the request for the display data;
       acquire the usage information of the image forming device corresponding to the identification information of the image forming device from the usage information storage device, which stores the usage information of the image forming device in association with the identification information of the image forming device;
       using the acquired usage information of the image forming device, generate the display data in a layout optimized for a display on which the request source device displays the usage information of the image forming device; and
       provide the generated display data to the request source device, wherein in response to the request, which is received from an information processing apparatus, and is to provide the display data corresponding to the image forming device, the request including identification information of an organization using the image forming device, the processing circuitry is further configured to acquire the usage information of the image forming device corresponding to the identification information of the organization, and
    the image forming device includes second processing circuitry configured to:

request the display data relating to the usage information of the image forming device, the request including the identification information of the image forming device; and display the generated display data, which is provided from the display data generating device.

12. The information processing system of claim 11, wherein the first processing circuitry is further configured to:

receive a print data request from the image forming device; and generate print data in response to the print data request received from the image forming device, and wherein the second processing circuitry is further configured to:

send the print data request, the print data request including the identification information of the image forming device; and print the print data provided from the display data generating device.

13. The system of claim 11, wherein the usage information includes at least one of resource usage data of the image forming device, time usage data of the image forming device, and data usage data of the image forming device.

14. The system of claim 11, further comprising the usage information storage device, which includes third processing circuitry configured to generate, as part of the usage information, monthly usage data from daily usage data received from the device.

\* \* \* \* \*